(12) United States Patent
Domas et al.

(10) Patent No.: US 6,275,644 B1
(45) Date of Patent: Aug. 14, 2001

(54) LIGHT FIXTURE INCLUDING LIGHT PIPE HAVING CONTOURED CROSS-SECTION

(75) Inventors: Ben V. Domas, Oakland; Alvin D. McCauley, Holly, both of MI (US)

(73) Assignee: Transmatic, Inc., Waterford, MI (US)

( * ) Notice: Subject to any disclaimer, the term of this patent is extended or adjusted under 35 U.S.C. 154(b) by 0 days.

(21) Appl. No.: 09/337,940

(22) Filed: Jun. 22, 1999

Related U.S. Application Data

(63) Continuation-in-part of application No. 09/211,659, filed on Dec. 15, 1998, now abandoned.

(51) Int. Cl.[7] .................. G02B 6/10; G02B 6/00
(52) U.S. Cl. .................. 385/146; 385/901; 362/551
(58) Field of Search .................. 385/146, 147, 385/901; 362/31, 551, 223, 217

(56) References Cited

U.S. PATENT DOCUMENTS

| | | |
|---|---|---|
| 4,557,551 | 12/1985 | Dyott . |
| 4,668,264 | 5/1987 | Dyott . |
| 4,669,814 | 6/1987 | Dyott . |
| 4,704,660 | 11/1987 | Robbins . |
| 4,734,829 | 3/1988 | Wu et al. . |
| 4,782,430 | 11/1988 | Robbins et al. . |
| 4,957,347 | 9/1990 | Zarian . |
| 5,052,778 | 10/1991 | Jamshid . |
| 5,067,831 | 11/1991 | Robbins et al. . |
| 5,122,580 | 6/1992 | Zarian et al. . |
| 5,149,467 | 9/1992 | Zarian . |
| 5,218,660 | 6/1993 | Omata . |
| 5,221,387 | 6/1993 | Robbins et al. . |
| 5,225,166 | 7/1993 | Zarian et al. . |
| 5,295,047 | * 3/1994 | Windross ............................... 362/26 |
| 5,298,327 | 3/1994 | Zarian et al. . |
| 5,339,178 | 8/1994 | Phelps, III et al. . |
| 5,659,643 | * 8/1997 | Appeldorn et al. .................... 385/31 |
| 5,676,445 | * 10/1997 | Kato ...................................... 362/32 |
| 5,784,517 | * 7/1998 | Johanson .............................. 385/146 |
| 5,857,758 | * 1/1999 | Dealey, Jr. et al. .................... 362/32 |

* cited by examiner

*Primary Examiner*—Frank G. Font
*Assistant Examiner*—Layla Lauchman
(74) *Attorney, Agent, or Firm*—Reising, Ethington, Barnes, Kisselle, Learman & McCulloch, P.C.

(57) ABSTRACT

A light pipe support assembly for mounting a light pipe in a light fixture includes a support structure having at least one pair of opposed inwardly-extending protrusions and a light pipe having an elongated light-transmissive mono-filament core supported on the support structure. The light pipe has a generally constant cross-sectional size and shape along its length. The light pipe includes an elongated upper lobe integrally extending from an elongated lower lobe. The lower lobe has an arcuate lateral profile. The light pipe includes an elongated laterally pinched region between the upper lobe and the lower lobe. The pinched region has a width less than the width of the upper lobe and less than the width of the lower lobe. The width of the pinched region is also slightly less that the width of a gap between the inwardly-extending protrusions of the support structure. Because the width of the gap between the protrusions is smaller than the width of the upper lobe, the light pipe can be supported on the support structure by resting the upper lobe on the protrusions with the pinched region disposed between the protrusions and the lower lobe suspended below the protrusions.

20 Claims, 1 Drawing Sheet

LIGHT FIXTURE INCLUDING LIGHT PIPE HAVING CONTOURED CROSS-SECTION

This is a continuation in part of U.S. patent application Ser. No. 09/211,659, filed Dec. 15, 1998 (now abandoned).

TECHNICAL FIELD

This invention relates generally to fiber optic light pipes and, more specifically, to such light pipes configured to include mounting appendages.

INVENTION BACKGROUND

Light pipes are elongated monofilament or single fiber optic cables of relatively large diameter that are capable of transmitting light from one end to the other. Light pipes may either be "end-fire" light pipes, meaning that they are constructed to transmit light longitudinally with minimal lateral or radial light emission, or "side-fire" light pipes that are configured to both transmit light longitudinally and emit light laterally. Light pipes may include no more than a simple core of a clear plastic material, or may include one or more of a number of different claddings and coatings. End-fire light pipes may include jackets including claddings configured to prevent lateral light emissions. Side-fire light pipes may include claddings configured to encourage or diffuse such lateral emissions. These claddings may be flouropolymer tubes applied by such methods as heat shrinking the tube onto the core or inserting a core into a pre-formed cladding tube by pressure filling. Some light pipe jackets also include a clear or translucent plastic coating that surrounds and protects the cladding.

Light pipes are most commonly circular in cross section, but have also been formed in a number of other cross-sectional shapes. For example, U.S. Pat. No. 5,218,660 issued Jun. 8, 1993 to Omata discloses a light pipe having a polygonal cross-section. U.S. Pat. No. 4,734,829, issued Mar. 29, 1988 to Wu et al., discloses an arc lamp image transformer that includes a light pipe having the same arcuate cross-sectional shape as the beam of light it will transmit. U.S. Pat. Nos. 4,668,264 and 4,669,814 issued May 26, 1987 and Jun. 2, 1987, respectively, to Dyott, each disclose light pipes having a non-circular, e.g., half-circular, cross-sections each defining two transverse orthogonal axes. U.S. Pat. No. 5,221,387, issued Jun. 22, 1993 to Robbins et al. and assigned to Lumenyte International Corporation (the Lumenyte '387 patent) suggests that alternate cross-sectional light pipe shapes including squares, triangles and various fluted shapes might be used.

It is desirable to suspend or otherwise support light pipes in positions where they can transmit light from a source to a desired point and/or to illuminate a desired area. Some suspension systems disclosed in the prior art include rings or clips that encircle or partially encircle the light pipes they suspend. The rings or clips are affixed in some way to a supporting structure in a light fixture. Such suspension systems do not require modifications to the light pipes they are designed to suspend.

Other light pipe suspension systems include structures that integrally extend from some portion of a light pipe and that are configured to engage an adjacent support structure. For example, the Lumenyte '387 patent discloses a light pipe having a cross-sectional shape that includes a tangentially oriented elongated mounting protrusion included in an outer coating of the light pipe. The outer coating surrounds a cladding layer that surrounds a core of the light pipe. The protrusion extends the entire length of the light pipe and functions to aid in mounting the conduit to a backing, wall or other support structure. The mounting protrusion is extruded simultaneously with the coating in a co-extrusion process that forms the light pipe.

Another example of a light pipe suspension system that relies on an appendage extending from the light pipe is the system disclosed in U.S. patent application Ser. No. 08/767,969. The application is assigned to the assignee of the present application and discloses a light pipe having an elongated integral appendage extending radially outward from along the length of the light pipe and having a "Christmas tree"-shaped cross section. The "branches" of the tree are configured to engage opposed edges of an elongated mounting slot. Light pipes having integral appendages of this type have relatively complex cross-sectional shapes.

What is needed is a simple, cost-effective light pipe suspension system that includes a light pipe configured to mount easily to a supporting structure while being inexpensive to manufacture.

INVENTION SUMMARY

In accordance with this invention a light pipe support assembly is provided that includes an elongated light-transmissive monofilament core and an elongated laterally pinched region between elongated upper and lower lobes that allows the light pipe to be suspended between a pair of opposed inwardly-extending protrusions. The assembly comprises a support structure that includes at least one pair of the inwardly extending protrusions. The light pipe is supported on the support structure between the protrusions. The core has a generally constant cross-sectional size and shape along its length. The core includes an elongated upper lobe that integrally extends from an elongated lower lobe. The lower lobe has an arcuate lateral profile. The pinched region has a width less than the width of the upper lobe and less than the width of the lower lobe. The width of the pinched region is also slightly less that the width of a gap between the inwardly extending protrusions. The width of the gap between the protrusions is smaller than the width of the upper lobe. This allows the light pipe to be suspended from the protrusions by resting the upper lobe on the protrusions.

According to another aspect of the invention the upper lobe has an arcuate profile that facilitates an optional means of mounting the light pipe on the track by pushing the upper lobe edgewise through the gap between the protrusions or rails of the support track.

According to another aspect of the invention, the inwardly extending protrusions of the support structure are elongated parallel rails. The rails form a track for receiving the light pipe.

According to another aspect of the invention, the upper lobe is smaller than the lower lobe. By forming the upper lobe smaller, the amount material dedicated to supporting the light pipe, as opposed to transmitting light, is minimized and takes up less space above the rails.

According to another aspect of the invention, the light pipe support assembly is flexible. This flexibility allows the light pipe to be more easily transported and mounted and provides more design flexibility. Design flexibility is greater because curved sections of support track may be included. Mounting is easier because the light pipe can be more easily slid along the curved sections.

According to another aspect of the invention, the light pipe includes a jacket comprising a cladding layer. The cladding layer, which may comprise a fluoropolymer material, improves side-light dispersion. A generally transparent coating may be disposed on the cladding to protect the cladding.

According to another aspect of the present invention, the light pipe includes an elongated generally tubular jacket disposed on the core. The core may be disposed in the lower lobe and the upper lobe may comprise an elongated nub portion of the jacket.

According to another aspect of the invention a method is provided for making a light pipe support assembly comprising a support structure having a pair of opposed inwardly-extending protrusions, and a light pipe including an elongated light-transmissive mono-filament core supported on the support structure, the light pipe having a generally constant cross-sectional size and shape along a length of the light pipe, the light pipe including an elongated upper lobe integrally extending from an elongated lower lobe, the lower lobe having an arcuate lateral profile, the light pipe including an elongated laterally pinched region between the upper lobe and the lower lobe, the pinched region having a width less than the width of the upper lobe and less than the width of the lower lobe and slightly less that the width of a gap between the inwardly-extending protrusions, the width of the gap between the protrusions being smaller than the width of the upper lobe. According to the method the support structure is first provided, then the light pipe is formed by extruding the light transmissive material through a die having a die face opening approximating the desired lobed cross-sectional shape of the core. The light pipe is then supported on the support structure by positioning the light pipe pinched region between the inwardly extending protrusions of the support structure.

According to another aspect of the method, a cladding layer is provided on the core when the light pipe is formed. The cladding layer may be co-extruded with the core. Co-extrusion reduces cost by eliminating manufacturing steps.

According to another aspect of the method, a support structure is provided that includes inwardly-projecting protrusions that comprise a pair of parallel spaced-apart elongated rails. The light pipe is supported by sliding the light pipe lengthwise along the rails with the pinched region disposed between the rails and with the upper lobe supported on the rails.

According to another aspect of the invention a method is provided for making a light pipe support assembly that includes providing a support structure, providing an elongated, generally tubular jacket, supporting the jacket in a configuration defining a desired cross-sectional shape of the light pipe, providing the light transmissive core material within the jacket, and supporting the light pipe on the support structure by positioning the light pipe pinched region between the inwardly extending protrusions of the support structure.

According to another aspect of this method, the light transmissive core material is provided by providing the core material in molten state, pressure filling the jacket with the molten core material; and allowing the core material to harden within the jacket. The jacket may be formed to include an elongated nub portion that integrally and radially extends outward from along a circumferential wall of the jacket configured to surround the core, the nub defining the upper lobe of the light pipe.

BRIEF DRAWING DESCRIPTION

To better understand and appreciate the invention, refer to the following detailed description concerning the accompanying drawings.

PREFERRED EMBODIMENT DESCRIPTION

Figure 1:
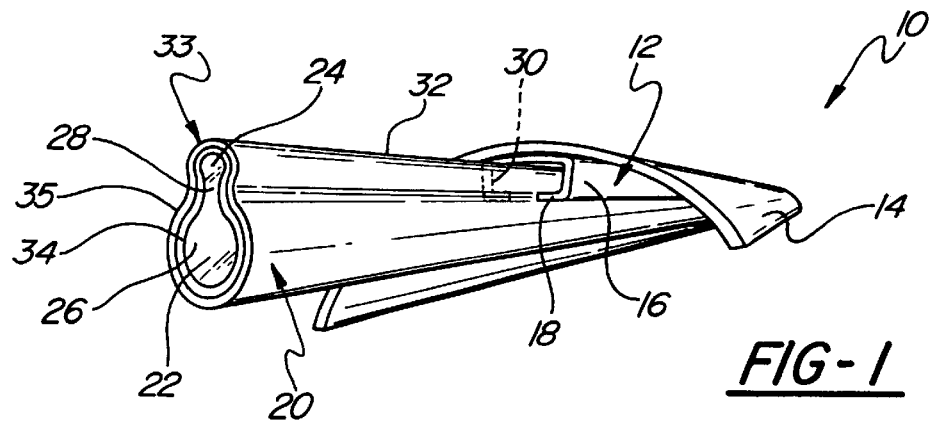
FIG. 1 is a perspective view of a light pipe constructed according to the present invention.

A first embodiment of a light pipe support assembly for mounting a light pipe in a light fixture is generally shown at 10 in FIG. 1. A second embodiment of such a light pipe support assembly is shown at 10' in FIG. 3. Reference numerals with the designation prime (') in FIG. 3 indicate alternative configurations of elements that also appear in the first or second embodiment. Unless indicated otherwise, where a portion of the following description uses a reference numeral to refer to the figures, I intend that portion of the description to apply equally to elements designated by primed numerals in FIG. 3.

The assembly 10 comprises a support structure generally indicated at 12 in FIG. 1. In FIG. 1, the support structure 12 is shown attached to a concave reflective portion 14 of a light fixture. The support structure 12 includes a support track 16 having at least one pair of opposed inwardly-extending elongated protrusions in the form of parallel rails 18.

Figure 2:
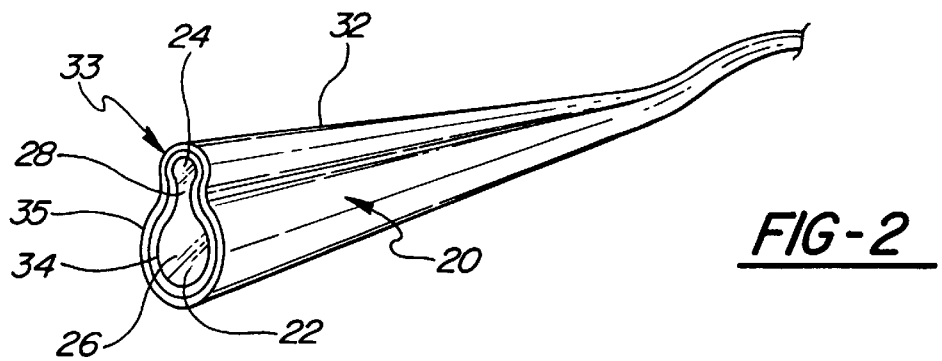
FIG. 2 is a perspective view of the present invention supported in a support structure.

An elongated light pipe, generally indicated at 20 in FIGS. 1 and 2, is supported on the support structure 12 and is configured in such a way that it can be supported on the parallel rails 18 of the support track 16. The light pipe 20 includes a light-transmissive mono-filament core shown at 22 in FIGS. 1 and 2. The core 22 has a generally constant cross-sectional size and shape along its length. The core 22 includes an elongated upper lobe 24 that integrally extends from an elongated lower lobe 26. The lower lobe 26 has an arcuate lateral profile as defined by a plane extending through the core 22 perpendicular to the length of the core 22. The lower lobe 26 extends in a generally radial direction opposite the upper lobe 24. The upper and lower lobes 24, 26 extend longitudinally along the entire length of the core 22.

The core 22 includes an elongated laterally pinched region shown at 28 in FIGS. 1 and 2. The pinched region 28 is disposed between the upper lobe 24 and the lower lobe 26 of the core 22. The pinched region 28 of the core 22 runs the entire length of the light pipe 20. The pinched region 28 has a width that is less than the width of the upper lobe 24 and is less than the width of the lower lobe 26. The width of the pinched region 28 is also slightly less that the width of a gap 30 between the inwardly-extending protrusions. The width of the gap 30 between the protrusions is smaller than the width of the upper lobe 24. This allows the light pipe 20 to be suspended from the protrusions by resting respective upper surfaces of the protrusions on respective lower surfaces of the upper lobe 24.

The upper lobe 24 has an arcuate profile. The arcuate profile of the upper lobe 24 facilitates an optional means of mounting the light pipe 20 on the support track 16 in which the light pipe 20 is forced through the gap 30 between the protrusions or rails 18 of the support track 16. This is done by presenting an arcuate top surface 32 of the lobe to the gap 30 between the rails 18 of the support track 16 then forcing the upper lobe 24 through the gap 30 laterally rather than longitudinally. The arcuate top surface 32 of the light pipe 20 helps the upper lobe 24 to gradually compress as its increasing width is forced through the gap 30 between the support track rails 18. In other words, the arcuate top surface 32 makes the upper lobe 24 easier to push through the gap 30.

The upper lobe 24 of the core 22 is smaller than the lower lobe 26. The upper lobe 24 is formed smaller to minimize the amount of light transmissive material dedicated to supporting the light pipe 20 rather than transmitting and emitting light. Because the upper lobe 24 is smaller, it also requires less space. Therefore, the area above the inwardly-extending protrusions or rails 18 of the support structure 12 need not be designed to include as much space.

The light pipe 20 comprises flexible plastic materials to allow the light pipe 20 to be more easily transported and mounted and to provide more design flexibility. Design flexibility is greater because the light pipe 20 can be mounted to curved sections of support track 16. The flexibility of the light pipe 20 makes mounting easier because the light pipe 20 can be more easily slid along curved sections of support track 16.

A jacket, generally indicated at 33 in FIGS. 1 and 2, is disposed on and circumferentially surrounds the core 22 along the full length of the core 22. The jacket 33 includes an inner cladding layer 34 that improves side-light dispersion as disclosed, for example in U.S. Pat. No. 5,052,778 issued Oct. 1, 1991 and assigned to Lumenyte International Corporation. The cladding layer 34 may comprise any of a number of light dispersing substances such as fluoropolymer materials. Examples of such flouropolymer materials include DuPont TEFLON™ or heat shrinkable DuPont FEP TEFLON™. The jacket 33 also includes a generally transparent outer plastic coating 35 disposed on the inner cladding layer 34 to protect the cladding layer 34. Other embodiments may include no outer plastic coating.

The light pipe support assembly 10 is constructed by first providing the support structure 12 and the light pipe 20. The support structure 12 is constructed to include the parallel spaced-apart elongated rails 18.

The light pipe 20 may be fabricated by co-extruding the light transmissive core material, the cladding layer 34 and/or the plastic coating 35 through a co-extrusion die. Co-extrusion is well known in the art as a process by which an outer coating or jacket can be simultaneously extruded with and applied to the outer surface of a core 22.

A suitable co-extrusion die would include an inner die face opening approximating the desired lobed cross-sectional shape of the core 22. As the light transmissive material is drawn through the inner die face opening of such a co-extrusion die, the material is formed into an elongated form having a constant cross-sectional shape complementing that of the inner die face opening.

Such a co-extrusion die would also include an outer die face opening approximating the desired cross-sectional shape of the cladding layer 34 and surrounding the inner die face opening. As the cladding material is drawn through the outer die face opening of the co-extrusion die the cladding material is formed onto and around the core 22.

Such a co-extrusion die might also include a third die face opening disposed radially outward o the outer die face opening and approximating the desired cross-sectional shape of the plastic coating 35. As the coating material is drawn through the third die face opening of the co-extrusion die the coating material is formed onto and around the cladding layer 34.

Following co-extrusion, the light pipe 20 is mounted on the support structure 12 by positioning the light pipe pinched region 28 between the inwardly extending protrusions or rails 18 of the support structure 12. The light pipe 20 is preferably positioned between the rails 18 by sliding the light pipe 20 end-first into the support structure 12. The light pipe 20 is slid lengthwise along the rails 18 with the pinched region 28 slid between the rails 18 and with the upper lobe 24 supported on the rails 18. Because the upper lobe 24 is wider at its widest point than the gap 30 between the rails 18, the rails 18 prevent the upper lobe 24 from passing through the gap 30 between the rails 18.

Figure 3:
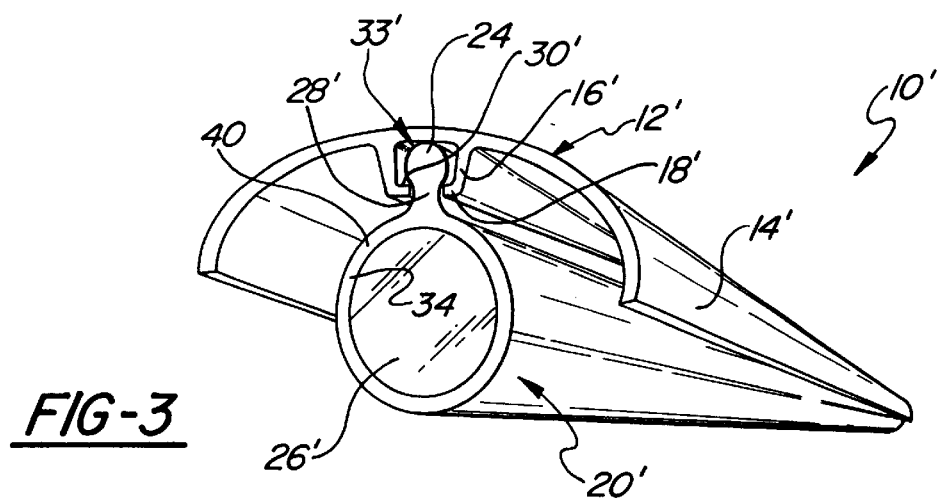
FIG. 3 is a perspective view of a light pipe constructed according to a second embodiment of the present invention and supported in a support structure.

As with the first light pipe support assembly embodiment, the second light pipe support assembly embodiment, generally indicated at 10' in FIG. 3, includes a generally cylindrical flexible light pipe 20' supported on a rigid metallic support structure 12' having at least one pair of opposed inwardly-extending parallel rails or protrusions 18' that form a track 16' for supporting the light pipe 20'. The light pipe 20' has a generally constant cross-sectional size and shape along its length and comprises an elongated generally tubular jacket 33' having a circumferential wall portion, shown at 40 in FIG. 3, that surrounds an elongated light-transmissive mono-filament core 22.

The light pipe 20' includes an elongated upper lobe 24' that integrally extends from an elongated lower lobe 26'. Both the upper and lower lobes 24', 26' have generally circular lateral profiles that are integrally connected by an elongated laterally pinched region 28' disposed between the two lobes 24', 26'. A single, continuous outer surface surrounds the lobes 24', 26' and the pinched region 28'.

The pinched region 28' of the light pipe 20' has a width less than the width of the upper lobe 24', less than the width of the lower lobe 26' and slightly less that the width of a gap 30' between the inwardly-extending protrusions 18'. The width of the gap 30' between the protrusions 18' is smaller than the width of the upper lobe 24' to allow the light pipe 20' to be supported on the support structure 12' by resting the upper lobe 24' on the protrusions 18' with the pinched region 28' disposed between the protrusions 18' and the lower lobe suspended below the protrusions 18'. The core 22' is disposed in the lower lobe and the upper lobe 24' comprises a radially integrally extending portion of the jacket 33'.

The tipper lobe 24' of the light pipe 20' comprises an elongated nub portion of the jacket 33' that extends radially and integrally from along the length of the circumferential wall portion 40 of the jacket 33'. In other words, the nub defines the upper lobe 24' of the light pipe 20'. The jacket 33' comprises an elongated generally tubular fluoropolymer inner cladding layer 34' that is disposed on and circumferentially surrounds the core 22' along the length of the core 22'.

A light pipe support assembly 10' can be constructed according to the second embodiment of the invention by fabricating the support structure 12' and the elongated, generally tubular jacket 33'. The jacket 33', or cladding layer 34', is formed of a flexible fluoropolymer material to include the elongated nub portion that integrally and radially extends outward from along the circumferential wall portion 40 of the jacket 33'. Once formed, the jacket 33' is supported in such a way as to hold the jacket 33' in a shape or configuration defining a desired cross-sectional shape of the light pipe 20' being fabricated. The light transmissive core material is then disposed within the jacket 33' by pressure filling. The pressure filling process includes heating the light transmissive material until it is in a liquid or semi-liquid state, then filling the jacket 33' with the molten light transmissive core material by injecting the core material into the jacket 33' under pressure. The core material is then allowed to harden within the jacket 33'. The completed light pipe 20' is then supported on the support structure 12' by positioning the light pipe pinched region 28' between the inwardly extending protrusions 18' of the support structure 12' in a manner similar to that described with respect to the first embodiment.

I intend the above description to illustrate embodiments of the present invention by using descriptive rather than limiting words. Obviously, there are many ways that one might modify these embodiments while remaining within the scope of the claims. In other words, there are many other ways that one may practice the present invention without exceeding the scope of the claims.

We claim:

1. A light pipe support assembly for mounting a light pipe on a light fixture, the assembly comprising:

a support structure having at least one pair of opposed inwardly-extending protrusions; and an elongated light-transmissive mono-filament core supported on the support structure, the core having a generally constant cross-sectional size and shape along a length of the core; the improvement comprising:

the core including an elongated upper lobe integrally extending from an elongated lower lobe, the lower lobe having an arcuate lateral profile;

the core including an elongated laterally pinched region between the upper lobe and the lower lobe, the pinched region having a width less than the width of the upper lobe and less than the width of the lower lobe and slightly less that the width of a gap between the inwardly-extending protrusions, the width of the gap between the protrusions being smaller than the width of the upper lobe to allow the light pipe to be supported on the support structure by resting the upper lobe on the protrusions with the pinched region disposed between the protrusions and the lower lobe suspended below the protrusions.

2. A light pipe support assembly as defined in claim 1 in which the upper lobe has an arcuate profile.

3. A light pipe support assembly as defined in claim 1 in which the inwardly-extending protrusions of the support structure are elongated parallel rails.

4. A light pipe support assembly as defined in claim 1 in which the upper lobe is smaller than the lower lobe.

5. A light pipe support assembly as defined in claim 1 in which the light pipe comprises a flexible material.

6. A light pipe support assembly as defined in claim 1 further including a jacket comprising a cladding layer disposed on and circumferentially surrounding the core along the length of the core.

7. A light pipe support assembly as defined in claim 6 in which the cladding layer comprises a fluoropolymer material.

8. A light pipe support assembly as defined in claim 6 in which the jacket includes a generally transparent coating disposed on the cladding.

9. A light pipe support assembly for mounting a light pipe on a light fixture, the assembly comprising:

a support structure having at least one pair of opposed inwardly-extending protrusions; and a light pipe supported on the support structure, the light pipe having a generally constant cross-sectional size and shape along a length of the light pipe, the light pipe comprising an elongated generally tubular jacket surrounding an elongated light-transmissive mono-filament core; the improvement comprising:

the light pipe including an elongated upper lobe integrally extending from an elongated lower lobe, the lower lobe having an arcuate lateral profile;

the light pipe including an elongated laterally pinched region between the upper lobe and the lower lobe, the pinched region having a width less than the width of the upper lobe and less than the width of the lower lobe and slightly less that the width of a gap between the inwardly-extending protrusions, the width of the gap between the protrusions being smaller than the width of the upper lobe to allow the light pipe to be supported on the support structure by resting the upper lobe on the protrusions with the pinched region disposed between the protrusions and the lower lobe suspended below the protrusions, the core being disposed in the lower lobe and the upper lobe comprising a portion of the jacket.

10. A light pipe support assembly as defined in claim 9 in which the upper lobe comprises an elongated nub portion of the jacket.

11. A light pipe support assembly as defined in claim 9 in which the jacket includes an elongated generally tubular cladding layer disposed on and circumferentially surrounding the core along the length of the core.

12. A light pipe support assembly as defined claim 11 in which the cladding layer comprises a fluoropolymer material.

13. A method for making a light pipe support assembly comprising a support structure having a pair of opposed inwardly-extending protrusions, and an elongated light-transmissive mono-filament core supported on the support structure, the core having a generally constant cross-sectional size and shape along a length of the core, the core including an elongated upper lobe integrally extending from an elongated lower lobe, the lower lobe having an arcuate lateral profile, the core including an elongated laterally pinched region between the upper lobe and the lower lobe, the pinched region having a width less than the width of the upper lobe and less than the width of the lower lobe and slightly less that the width of a gap between the inwardly-extending protrusions, the width of the gap between the protrusions being smaller than the width of the upper lobe; the method including the steps of:

providing the support structure;

forming the light pipe by extruding the light transmissive material through a die having a die face opening approximating the desired lobed cross-sectional shape of the core; and supporting the light pipe on the support structure by positioning the light pipe pinched region between the inwardly extending protrusions of the support structure.

14. The method of claim 13 in which the step of forming the light pipe includes the additional step of providing a jacket comprising a cladding layer on the core.

15. The method of claim 14 in which the step of providing a jacket includes the step of co-extruding the cladding layer with the core.

16. The method of claim 13 in which the step of providing the support structure includes the step of providing such a structure having inwardly-projecting protrusions that comprise a pair of parallel spaced-apart elongated rails and in which the step of supporting the light pipe includes the step of sliding the light pipe lengthwise along the rails with the pinched region disposed between the rails and with the upper lobe supported on the rails.

17. A method for making a light pipe support assembly comprising a support structure having a pair of opposed inwardly-extending protrusions, and a light pipe having an elongated light-transmissive mono-filament core disposed within an elongated generally tubular jacket, the light pipe supported on the support structure, the light pipe having a generally constant cross-sectional size and shape along a length of the light pipe, the light pipe including an elongated upper lobe integrally extending from an elongated lower lobe, the lower lobe having an arcuate lateral profile, the light pipe including an elongated laterally pinched region between the upper lobe and the lower lobe, the pinched region having a width less than the width of the upper lobe and less than the width of the lower lobe and slightly less that the width of a gap between the inwardly-extending protrusions, the width of the gap between the protrusions being smaller than the width of the upper lobe; the method including the steps of:

providing the support structure;

providing the elongated, generally tubular jacket;

supporting the jacket in a configuration defining a desired cross-sectional shape of the light pipe;

providing the light transmissive core material within the jacket; and supporting the light pipe on the support structure by positioning the light pipe pinched region between the inwardly extending protrusions of the support structure.

18. The method of claim 17 in which the step of providing the light transmissive core material includes the steps of:

providing the core material in molten state;

pressure filling the jacket with the molten core material; and allowing the core material to harden within the jacket.

19. The method of claim 17 in which the step of providing the jacket includes the additional step of forming the jacket to include an elongated nub portion that integrally and radially extends outward from along a circumferential wall of the jacket configured to surround the core, the nub defining the upper lobe of the light pipe.

20. The method of claim 17 in which the step of providing the jacket includes the step of forming a cladding layer of a fluoropolymer material.

* * * * *

UNITED STATES PATENT AND TRADEMARK OFFICE
CERTIFICATE OF CORRECTION

PATENT NO.    : 6,275,644 B1
DATED         : August 14, 2001
INVENTOR(S)   : Domas et al.

It is certified that error appears in the above-identified patent and that said Letters Patent is hereby corrected as shown below:

Column 2,
Line 56, after "the amount" insert therein -- of --.

Column 5,
Line 59, after "radially outward" delete [0] and insert therein -- of --.

Column 6,
Line 32, after "slightly less" delete [that] and insert therein -- than --.
Line 42, before "lobe 24" delete [tipper] and insert therein -- upper --.

Column 7,
Line 31, after "slightly less" delete [that] and insert therein -- than --.

Column 8,
Line 39, after "slightly less" delete [that] and insert therein -- than --.

Column 9,
Line 12, after "slightly less" delete [that] and insert therein -- than --.

Signed and Sealed this

Twenty-fifth Day of June, 2002

*Attest:*

*Attesting Officer*

JAMES E. ROGAN
*Director of the United States Patent and Trademark Office*